(12) United States Patent
Lee

(10) Patent No.: US 6,919,824 B2
(45) Date of Patent: Jul. 19, 2005

(54) KEYPAD ASSEMBLY WITH SUPPLEMENTARY BUTTONS AND METHOD FOR OPERATING THE SAME

(75) Inventor: Jae Wook Lee, Daejeon (KR)

(73) Assignees: Electronics and Telecommunications Research Institute (KR); Korea Telecom (KR)

( * ) Notice: Subject to any disclaimer, the term of this patent is extended or adjusted under 35 U.S.C. 154(b) by 657 days.

(21) Appl. No.: 10/126,220

(22) Filed: Apr. 18, 2002

(65) Prior Publication Data

US 2003/0107500 A1 Jun. 12, 2003

(30) Foreign Application Priority Data

Dec. 12, 2001 (KR) .................................. 10-2001-0078508

(51) Int. Cl.[7] ........................ H03K 17/94; H03M 11/00
(52) U.S. Cl. .................... 341/20; 341/22; 345/168; 345/169; 379/433.06; 379/433.07; 400/98
(58) Field of Search ................ 341/20, 22; 345/168, 345/169; 379/433.06, 433.07; 400/98

(56) References Cited

U.S. PATENT DOCUMENTS

| | | | |
|---|---|---|---|
| 2002/0097227 A1 * | 7/2002 | Chu et al. .................. | 345/168 |
| 2003/0064710 A1 * | 4/2003 | Lee ............................ | 455/414 |
| 2003/0122784 A1 * | 7/2003 | Shkolnikov ................ | 345/169 |
| 2005/0043063 A1 * | 2/2005 | Dinn .......................... | 455/566 |

FOREIGN PATENT DOCUMENTS

| | | |
|---|---|---|
| KR | 10-1997-0011506 | 3/1997 |
| KR | 1019950048201 | 5/1999 |
| KR | 1999-81180 | 11/1999 |
| KR | 2000148366 | 5/2000 |

* cited by examiner

Primary Examiner—Timothy Edwards, Jr.
(74) Attorney, Agent, or Firm—Blakely Sokoloff Taylor & Zafman (57) ABSTRACT

Disclosed herein is a keypad assembly with supplementary buttons and method for operating the same. The keypad assembly with supplementary buttons is in a small-sized mobile communication terminal including input buttons for representing a plurality of characters and a plurality of function buttons. The keypad assembly has at least one mode switching button, at least one selection-indication button, and a control unit. The mode switching button is formed on a side of the terminal for switching an input mode for inputting different characters. The selection-indication button is formed on a side of the terminal for selecting and indicating one of a plurality of characters assigned to each input button. The control unit selects and inputs a specific character assigned to each input button by pressing the input buttons and the selection-indication button so as to select a specific input mode by pressing the mode switching button and select and input one of a plurality of characters assigned to a specific input button under the selected input mode. The control unit displays the selected and inputted data on a display window of the terminal and stores the data.

14 Claims, 6 Drawing Sheets prior art
FIG. 1

KEYPAD ASSEMBLY WITH SUPPLEMENTARY BUTTONS AND METHOD FOR OPERATING THE SAME

BACKGROUND OF THE INVENTION

1. Field of the Invention

The present invention relates generally to a keypad assembly with supplementary buttons and method for operating the same, and more particularly to a keypad assembly with supplementary buttons and method for operating the same, in which there are provided a supplementary mode switching button for switching the mode of a keypad and at least one supplementary selection-indication button for selecting and indicating one of a plurality of characters assigned to a single button in small-sized terminals (for example, miniaturized, portable, and mobile communication terminals), so that various characters, such as alphabet characters, numerals, and special characters, can be inputted with only a limited number of input buttons.

2. Description of the Prior Art

Generally, an input device of a terminal is used to interface a person with a mechanical device, and is closely related to a person. The terminal input device is included in electronic calculators, portable computers, mobile communication terminals, etc., and is closely connected with people's lives. Especially, the use demand for small-sized/portable communication terminals, which are convenient to carry, rapidly increases. An input method in terminals is a method for allowing a machine to recognize the thought of a man. An input device mostly utilizes a keypad (or keyboard) input method in which inputs are carried out through a person's contact with the input device. In such a keypad input device, a plurality of buttons are installed in a limited space to input characters, so it frequently happens that several characters must be inputted by one button. This is especially true of miniaturized/portable terminals of a very restricted size.

Figure 1:
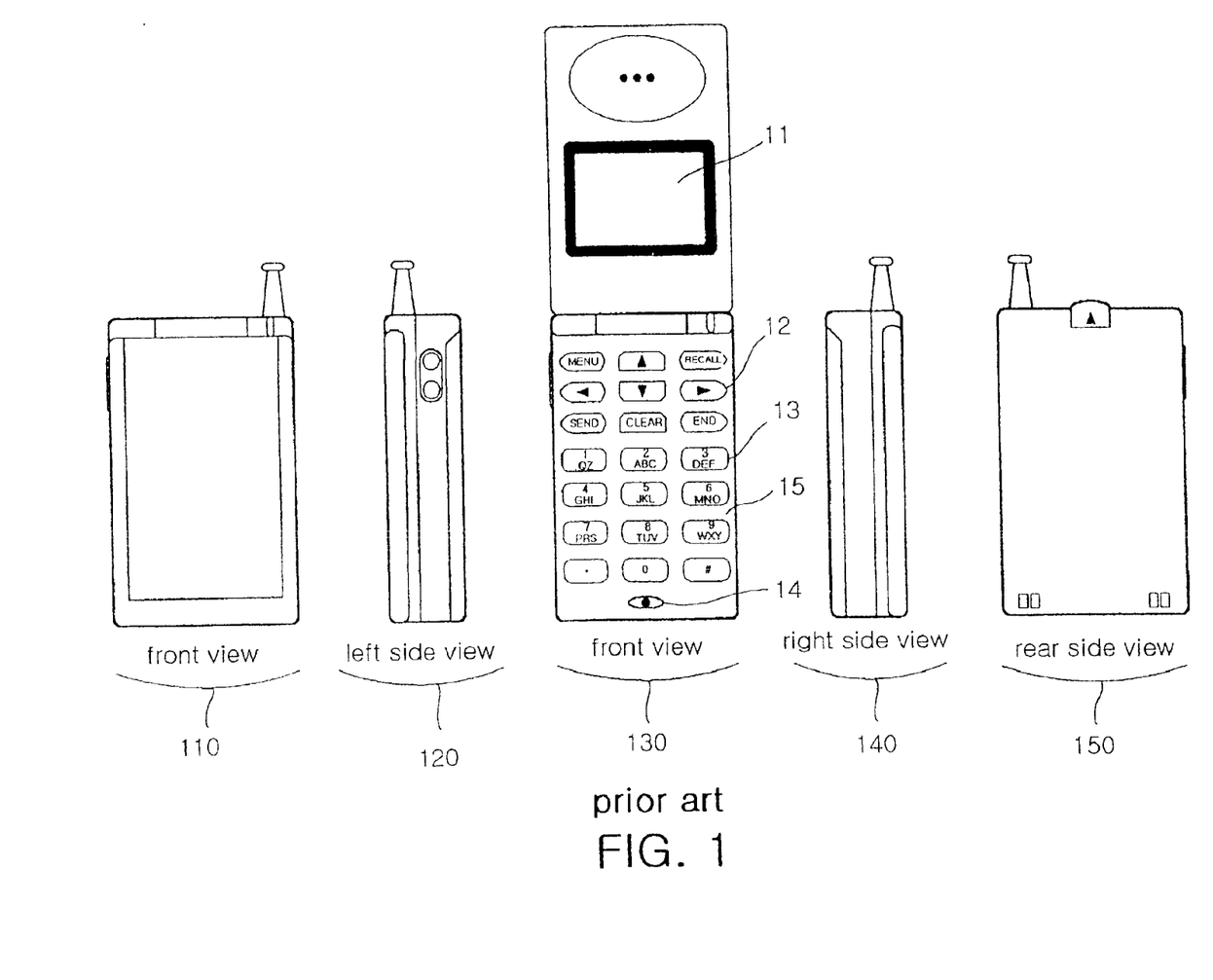
FIG. 1 is a view showing the construction of a conventional small-sized communication terminal.

As shown in the construction view of a conventional miniaturized communication terminal of FIG. 1, since conventional small-sized terminals, such as mobile telephones and Personal Digital Assistants (PDAs), are restricted by their physical sizes, it is impossible to install many buttons in a keypad within an input device. Accordingly, it is difficult to construct the buttons of the input device. In most cases, it is only possible that the keypad has a few input buttons.

FIG. 1 shows a closed front view 110, a left side view 120, an opened front view 130, a right side view 140, and a back view 150 of an example of a conventional terminal, which is based on character input buttons 13 for representing numerals 0 to 9, alphabet characters A to Z, and special characters * and #, a plurality of function buttons 12, and other typical multiple functions. Further, referring to FIG. 1, reference numerals 11, 14 and 15 represent a display window, a microphone, and a keypad, respectively. Here, the terminal of FIG. 1 is typical, and unimportant functions from the viewpoint of the present invention are omitted.

For the portable terminals, since many buttons cannot be installed especially due to their restrictive sizes, mode switching operations are achieved by using the function buttons to input various characters, that is, numerals, alphabet characters and special characters. Moreover, even in a selected mode, inconvenient operations such as pressing the buttons as many times as the number of characters assigned to any one button are required.

Further, the conventional portable terminals are problematic in that an assigned character is recognized by the number of presses of a specific button, such that the keypad must wait some delay time between the pressing operations. The construction of the keypad and its operating method require the user to perfectly understand the functions of the keypad. Further, the construction of the keypad and its operating method cause the user confusion, are inconvenient in their manipulation, and cause the input speed to be decreased, due to the pressing of each button several times for each operation.

As an example for solving these problems, a keypad formed in a three-layer structure such that one key can perform two operations by constructing two contact points on the keypad is disclosed in Korean Patent Application No. 1995-48201. In this keypad, each key signal sensing means is formed in upper and lower portions using the three-layer structure, such that when the user presses the keypad, two or more functions can be executed through one key by controlling the intensity of pressure exerted on a key. In this case, the intensity of pressure exerted on a key can be well controlled with respect to such a keypad. However, if three or more characters exit on a single key button, three intensities of pressure must be distinguished from one another. Accordingly, character input errors may occur in the use of the keypad.

Further, a keypad configuration produced to improve the accuracy in pressing keys by enhancing the height of a key, reducing the surface area of the key and increasing the space between keys is disclosed in Korean Patent Application No. 1997-11506. This keypad configuration prevents a user from pressing more than one key at a time, provides space for alphabet characters beside each push button, and illuminates them, thus improving the visibility for characters and numerals. However, this keypad configuration only provides the convenience for pressing keys, while not providing convenience for mode switching of characters or numerals and their input processes when a user inputs a variety of characters or numerals.

An example of an apparatus and method for selecting and inputting characters is disclosed in Japanese Patent No. 1998-315522. The Japanese Patent discloses an apparatus and method for assigning similar character and symbol groups to a plurality of preset specific positions in the inspection table of a plurality of characters and symbols composing a software and a keyboard, displaying the inspection list of assigned similar character and symbol groups when one key position of any one group at the specific positions is selected and indicated, and selecting one character or symbol of them to be inputted. The apparatus and method must display the inspection table of characters and symbols to be inputted, and the similar character and symbol group inspection list based on the selection-indication. Therefore, the apparatus and method has limitation on application to small-sized terminals. Further, in the apparatus and method, characters represented on the keypad itself are not selected and inputted, but the character and symbol groups displayed on a display window are inputted by selection-indication of a selection-indication means.

SUMMARY OF THE INVENTION

Accordingly, the present invention has been made keeping in mind the above problems occurring in the prior art, and an object of the present invention is to provide a keypad assembly with supplementary buttons and method for operating the same, in which a supplementary mode switching button for switching the mode of a keypad, and supplementary selection-indication buttons for selecting and indicating one of a plurality of characters on a single button are installed on a keypad, as well as a plurality of input buttons including typical telephone buttons and function buttons, thus allowing a user to easily input characters, with only a small number of button presses.

In accordance with one aspect of the present invention, there is provided a keypad assembly with supplementary buttons in a small-sized mobile communication terminal including input buttons for representing a plurality of characters and a plurality of function buttons, comprising at least one mode switching button formed on a side of the terminal for switching an input mode for inputting different characters; at least one selection-indication button formed on a side of the terminal for selecting and indicating one of a plurality of characters assigned to each input button; and a control unit for selecting and inputting a specific character assigned to each input button by pressing the input buttons and the selection-indication button so as to select a specific input mode by pressing the mode switching button and select and input one of a plurality of characters assigned to a specific input button under the selected input mode, for displaying the selected and inputted data on a display window of the terminal and storing the data.

In accordance with another aspect of the present invention, there is provided a method for operating a keypad assembly with supplementary buttons in a small-sized mobile communication terminal including a processor, input buttons for representing a plurality of characters and a plurality of function buttons, comprising the steps of a) forming at least one mode switching button for switching an input mode for inputting characters and at least one selection-indication button for selecting and indicating one of a plurality of characters assigned to each input button on a side of the terminal; b) switching an input mode for inputting characters using the mode switching button; c) pressing an input button representing a character to be inputted in the switched input mode; d) selecting and indicating one of characters assigned to each input button by pressing a corresponding selection-indication button of at least one selection-indication button according to the sequence of characters assigned to each input button; and e) displaying the selected and inputted data on a display window of the terminal and storing the data.

The present invention relates to a keypad assembly with supplementary buttons and method for operating the same, in which a mode switching button and selection-indication buttons are additionally formed, thereby enabling a user to more easily input characters by using only a small number of button presses.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the present invention is described in detail with reference to the drawings based on the preferred embodiment of this invention. The drawings show a preferred embodiment of this invention, which is described on the basis of a generally used mobile communication terminal.

Figure 2:
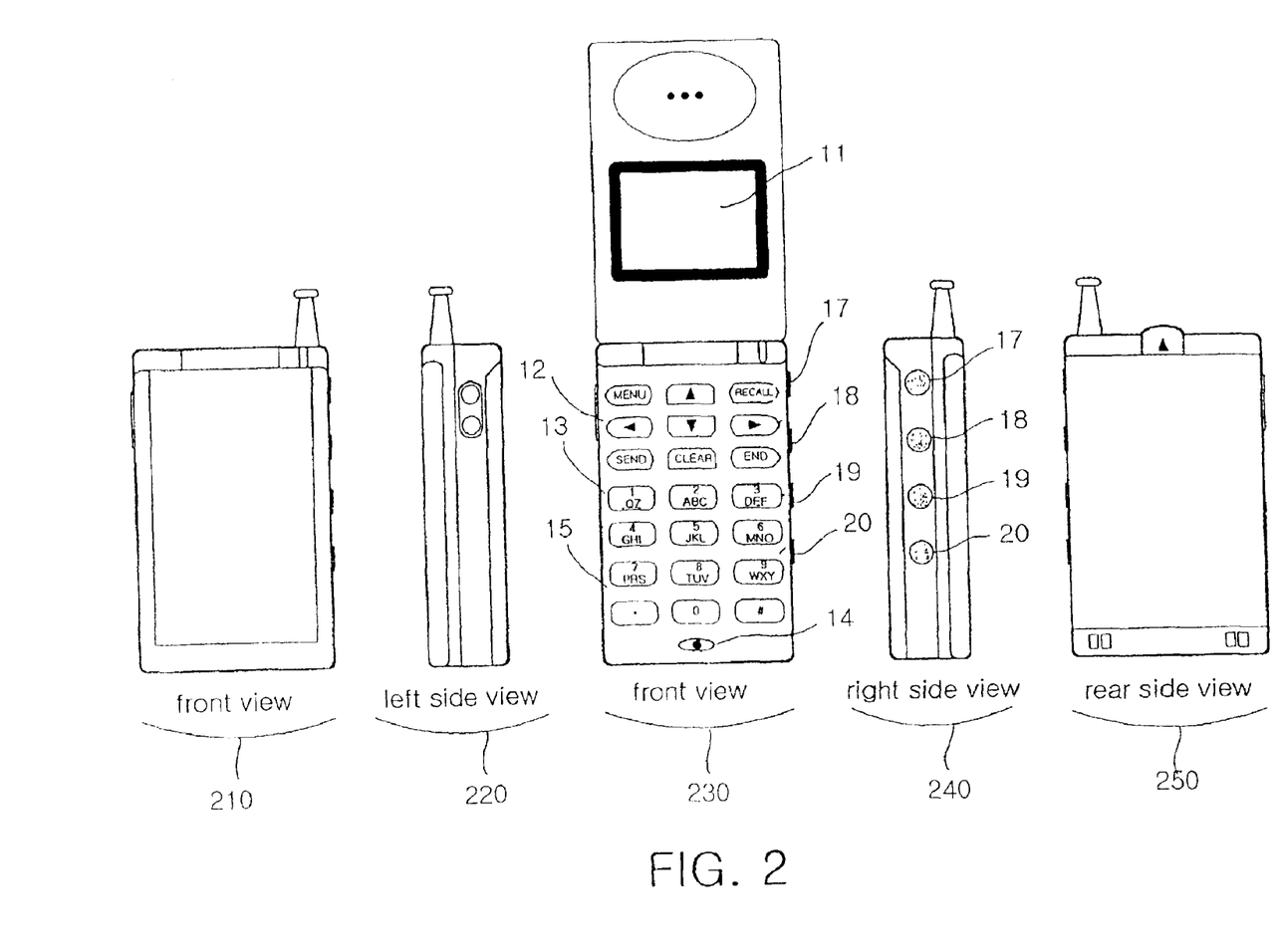
FIG. 2 is a view showing the construction of a small-sized communication terminal with supplementary buttons according to a preferred embodiment of the present invention.

FIG. 2 is a view showing the construction of a small-sized communication terminal with supplementary buttons according to a preferred embodiment of this invention. The same reference numerals are used throughout FIGS. 1 and 2 to designate the same components. The communication terminals of FIGS. 2 and 1 are very similar in their components and functions. However, they are different in that the terminal of FIG. 2 has a plurality of function and input buttons including typical character input buttons 13 representing characters such as "0 to 9", "A to Z", and "*", and "#", and a plurality of function buttons 12 as shown in FIG. 1, and it also has supplementary buttons installed on a right or left side of the terminal, such as a mode switching button 20 and first, second and third selection-indication buttons 17, 18 and 19. The mode switching button 20 switches the input mode of a character table, and first to third selection-indication buttons 17 to 19 select and indicate one of several characters on any one button of the character input buttons 13 or function buttons 12. FIG. 2 shows a closed front view 210, a left side view 220, an opened front view 230, a right side view 240 and a back view 250 of the terminal in which the mode switching button 20, the three selection-indication buttons 17 to 19 and the conventional buttons are installed according to a preferred embodiment of this invention. Consequently, the difference between the terminals of FIGS. 1 and 2 is that the supplementary buttons 17 to 20 are installed on the right (or left) side of the terminal. In this case, the number of the selection-indication buttons can be changed. However, if a large number of the selection-indication buttons are installed, even though the number of button presses for selecting and indicating one character can be reduced to be convenient, the size and cost of the terminal may be additionally increased, and its handling process may become complicated. On the other hand, if a small number of selection-indication buttons are installed, even though the size and cost of the terminal may be reduced, the number of button presses for selecting and indicating one character is increased, thus resulting in inconvenience to the user.

Figure 3:
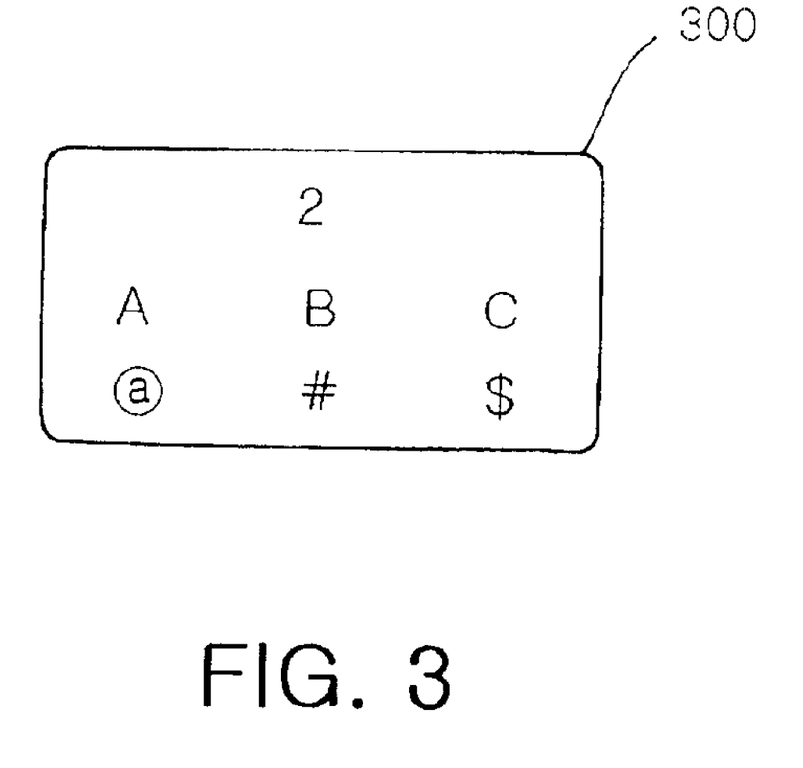
FIG. 3 is a view showing one of character input buttons shown in FIG. 2 according to a preferred embodiment of this invention.

Referring to FIGS. 2 and 3, the operations of the supplementary buttons are described in detail. FIG. 3 is a view showing an example of one input button 300 of character input buttons 13 of FIG. 2. The character input button 300 is an input button on which a numeral "2" is assigned in a numeral mode, alphabet characters "A", "B" and "C" in a alphabet character mode, and special characters "@", "#" and "$" in a special character mode.

The input button 300, as shown in FIG. 2, is one of a plurality of character input buttons installed on the keypad assembly of this invention, wherein the characters assigned to the input button 300 can be changed. Operations of the mode switching button 20 and the three selection-indication buttons 17 to 19 shown in FIG. 2 are described using the input button 300 of FIG. 3.

Switching operations among the numeral mode, the alphabet character mode and the special character mode are achieved by the mode switching button 20. That is, the numeral mode is initially set, and if a user presses the mode switching button 20 once, the input mode is switched to the alphabet character mode. If the user presses the button 20 one more time, the input mode is switched to the special character mode. If the user presses the button 20 a third time, the input mode is switched to the initial numeral mode. At this time, when the mode is switched, the switching sequence can be randomly set. Therefore, whenever the user presses the mode switching button 20 once, the input mode is switched. The initial input mode can be randomly set. The preferred embodiment of this invention is described by setting the initial mode to the numeral mode.

In the numeral mode, when the user presses the input button 300, the numeral 2 is inputted. During the numeral mode, if the user presses other character input buttons 13 of FIG. 2, set numerals are inputted. Since one numeral is assigned to each character input button 13, if the user presses any one character input button 13, a numeral corresponding to the pressed button 13 is inputted.

Contrary to the numeral mode, in the alphabet character mode, each character is inputted using the above three selection-indication buttons 17 to 19. Here, the characters are the alphabet. In the alphabet character mode, after pressing the input button 300, if the user presses the first selection-indication button 17, an alphabet character "A" is inputted. At this time, if the user presses the second selection-indication button 18, an alphabet character "B" is inputted, and if the user presses the third selection-indication button 19, an alphabet character "C" is inputted. Alternately, the alphabet character mode can be set such that, in the character mode, if the user presses the first selection-indication button 17 after pressing the input button 300, the alphabet character "B" or "C" is inputted. It is preferable that if the user presses the first to third selection-indication buttons 17 to 19, characters in the left portion, the center portion and the right portion on the button are respectively selected to be inputted.

On the other hand, in the special character mode switched by the mode switching button 20, each special character is inputted using the three selection-indication buttons 17 to 19. In the special character mode, after pressing the input button 300, if the user presses the first selection-indication button 17, "@" is inputted, if the user presses the second selection-indication button 18, "#" is inputted, and if the user presses the third selection-indication button 19, "$" is inputted. In the special character mode, it is preferable that if a user presses the first to third selection-indication buttons 17 to 19, special characters in the left portion, the center portion and the right portion on each special character button are inputted respectively.

Therefore, the numerals, alphabet characters, and the special characters are inputted by pressing the mode switching button 20, and the first to third selection-indication button 17, 18, and 19. For example, when the user desires to input "2 A C #", the input mode is initially in the numeral mode, such that if the user presses the input button 300, the numeral "2" is inputted. Then, since "A" is an alphabet character, the input mode must be switched to the alphabet character mode. Since the current mode is the numeral mode, the input mode is switched to the alphabet character mode by pressing the mode switching button 20 once. In the alphabet character mode, if the user presses the input button 300, and then presses the first selection-indication button 17, the alphabet character "A" is inputted. Then, if the user presses the third selection-indication button 19, the alphabet character "C" is inputted. Since "#" is a special character, the input mode is switched to the special character mode by pressing the mode switching button 20 one more time. In the special character mode, if the user presses the input button 300 and then presses the third selection-indication button 19, the special character "#" is inputted. Thereby, the above "2 A C #" are inputted.

The state transition of a user interface in the terminal using the mode switching button 20 and the three selection-indication buttons 17 to 19 is described with reference to FIG. 4.

Figure 4:
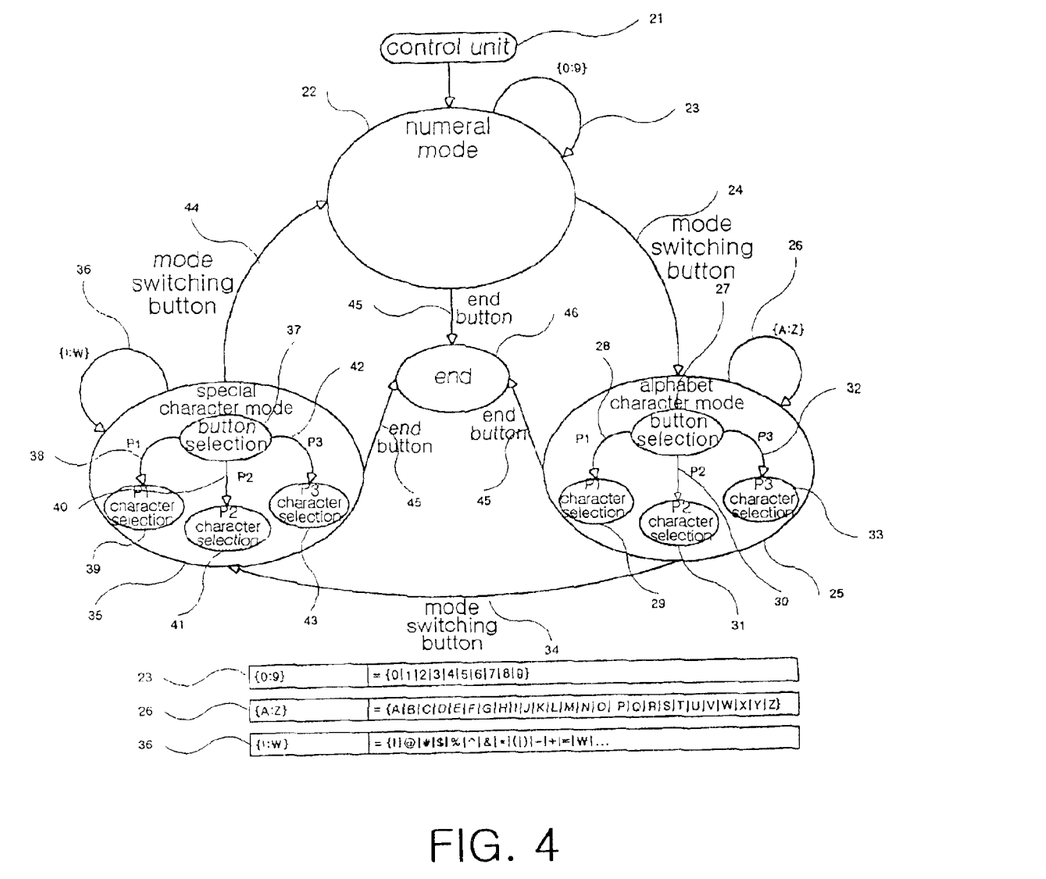
FIG. 4 is a view showing the state transition of a user interface of the small-sized terminal with supplementary buttons according to a preferred embodiment of this invention.

FIG. 4 is a view showing the state transition of a user interface of the small-sized terminal with supplementary buttons according to this invention. The input modes are largely classified into a numeral mode 22, an alphabet character mode 25 and a special character mode 35. The transition into each mode is circularly achieved by pressing the mode switching button 20. The control unit 21 in which an input operation starts in FIG. 3 inputs numerals by setting a basic input mode to the numeral mode 22. Preferably, the control unit 21 is an alphanumeric editor. If only numeral patterns (23; "0 to 9") are inputted in the numeral mode 22, the mode is always in the numeral mode 22. At this time, if a user presses the mode switching button 24 in the numeral mode 22, the mode transitions to the alphabet character mode 25, such that alphabet characters are inputted. If only alphabet character patterns (26; "A to Z") are inputted in the alphabet character mode 25, the mode is always in the alphabet character mode 25. If the user presses the mode switching button 34 in the alphabet character mode 25, the mode transitions to the special character mode 35, such that the special characters can be inputted. If only special character patterns (36; !, @, #, . . . ) are inputted in the special character mode 35, the mode is always in the special character mode 35. If the user presses the mode switching button 44 in the special character mode 35, the mode returns to the numeral mode 22. As described above, the mode switching is circularly achieved by pressing the mode switching button 20.

The internal states in the numeral mode 22, the alphabet character mode 25 and the special character mode 35 are described as follows. First, the internal state of the numeral mode 22 is empty, and no selection-indication button is used. That is, any of the three selection-indication buttons 17, 18 and 19 is not used. Since one numeral is assigned to each of the character input buttons 13, there is no internal state for the numeral mode. Contrary to this, for the alphabet character mode 25 and the special character mode 35, three alphabet characters or special characters are assigned to each button, such that there is use of the three selection-indication buttons 17 to 19 in their internal states. In FIG. 4, pressings of the first to third selection-indication buttons 17, 18 and 19 are respectively represented by P1, P2 and P3.

If a specific input button (for example, the input button 300 of FIG. 3) is pressed, and then the first selection-indication button 28 is pressed, the alphabet character mode 25 transitions to a state 29, in which a first assigned character of characters assigned to the input button is selected and inputted, such that the assigned character is selected. Further, if the second selection-indication button 30 is pressed, the alphabet character mode 25 transitions to a state 31, in which a second assigned character of characters assigned to the input button is selected and inputted, such that the assigned character is selected. Further, if the third selection-indication button 32 is pressed, the alphabet character mode 25 transitions to a state 33, in which a third assigned character of characters assigned to the input button is selected and inputted, such that the assigned character is selected. If the transitions of states 29, 31 and 33 for selecting and inputting each assigned alphabet character are completed and the selections are over, the internal state of the alphabet character mode 25 automatically transitions to the button selection state 27 to continuously input alphabet characters.

On the other hand, if a specific character input button (for example, the input button 300 of FIG. 3) is pressed, and then the first selection-indication button 38 is pressed, the special character mode 35 transitions to a state 39, in which a first assigned special character of special characters assigned to the special character input button is selected and inputted, such that the assigned special character is selected. Further, if the second selection-indication button 40 is pressed, the special character mode 35 transitions to a state 41, in which a second assigned special character of special characters assigned to the special character input button is selected and inputted, such that the assigned special character is selected. Further, if the third selection-indication button 42 is pressed, the special character mode 35 transitions to a state 43, in which a third assigned special character of special characters assigned to the special character input button is selected and inputted, such that the assigned special character is selected. If the transitions of the states 39, 41 and 43 for selecting and inputting each assigned special character are completed and the selections are over, the internal state of the special character mode 35 automatically transitions to the button selection state 37 to continuously input special characters.

If an END button 45, which is a special function button, is pressed in the numeral mode 22, the alphabet character mode 25 or the special character mode 35, an input end is executed, such that the keypad is escaped from the input state of the control unit 21.

As not shown in the drawings, the control unit 21 controls the above process, displays the data of the characters selected and inputted through the above process on the display window of the terminal, and stores the data.

Figure 5:
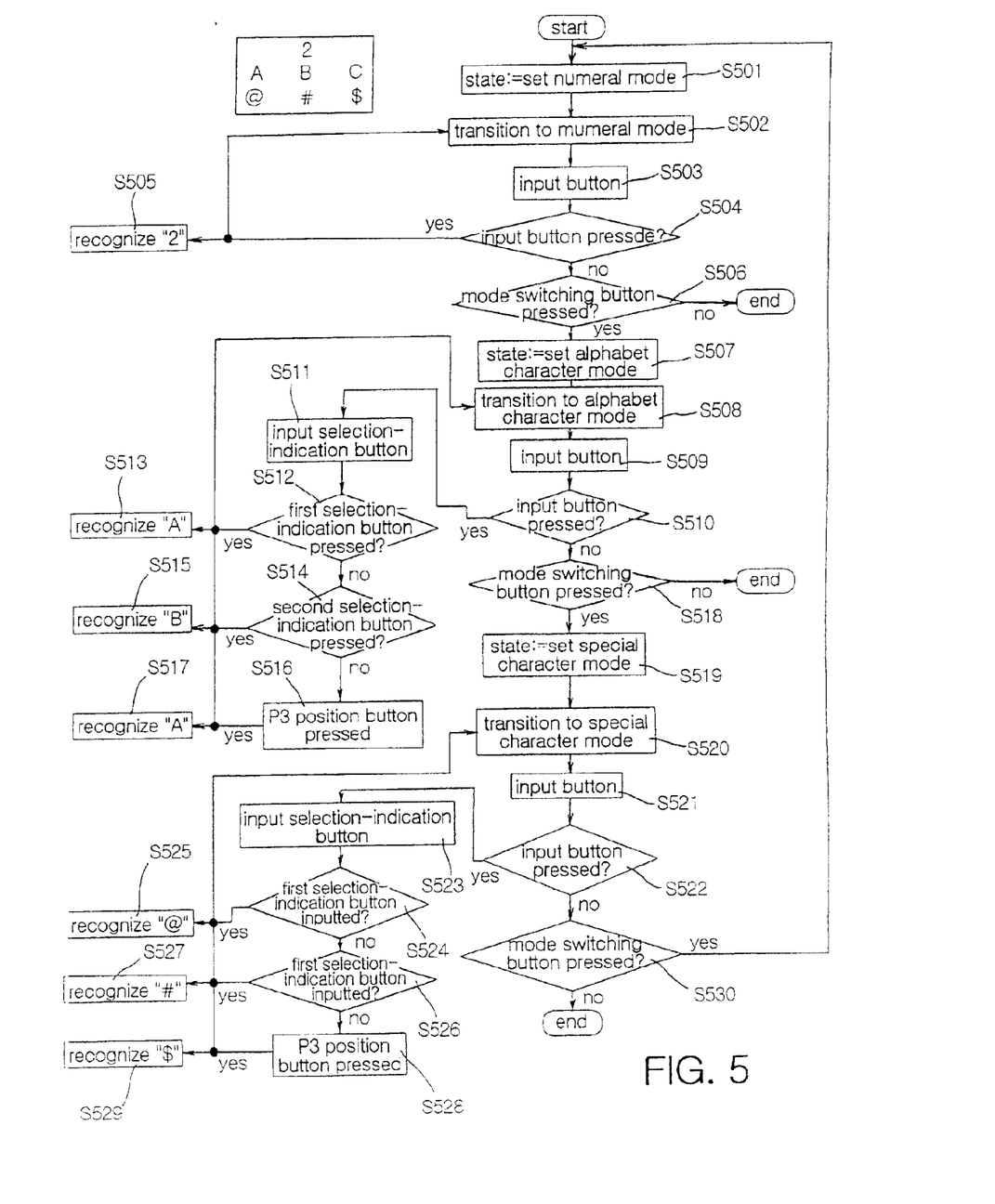
FIG. 5 is a flowchart of a user interface process of the small-sized terminal with supplementary buttons of this invention.

FIG. 5 is a flowchart of a user interface process of the small-sized terminal with supplementary buttons of this invention. FIG. 5 shows the internal recognition process of the user interface of the keypad assembly of this invention as an example using the specific input button 300, the three selection-indication buttons 17 to 19, and the mode switching button 20. This process is described with reference to the input button 300 of FIG. 3 as an example of the character input button 13. This entire process and its functions are controlled by the control unit 21.

If the input control starts under the control of the control unit 21, an initial mode state is set to the numeral mode (S501). Then, the mode transitions to the numeral mode 53 (S502). An arbitrary button is pressed in the numeral mode 53 (S503), and it is determined whether the pressed button is the input button 300 (S504). If the pressed button is the input button 300, the input of the numeral "2" is recognized (S505), and then the processing step returns to step S502 so as to continuously input numerals in the numeral mode. On the other hand, if the pressed button is not the input button 300, it is determined whether the pressed button is the mode switching button 20 (S506). If the pressed button is not the mode switching button 20 according to the determination result at step S506, the process ends, while if the pressed button is the mode switching button 20, the mode state is set to the alphabet character mode (S507) and transitions to the alphabet character mode (S508).

An arbitrary button is pressed in the alphabet character mode (S509), and it is determined whether the pressed button is the input button 300 (S510). If the pressed button is the input button 300 according to the determination result of step S510, the processing step proceeds to a next step S511 and a selection-indication button is pressed (S511). If the first selection-indication button 17 of the selection-indication buttons is pressed (S512), input of the alphabet character "A" is recognized (S513). If the second selection-indication button 18 is pressed (S514), input of the alphabet character "B" is recognized (S515). Further, if the third selection-indication button 19 is pressed (S516), input of the alphabet character "C" is recognized (S517). Then, the processing step returns to the step S508 so as to continuously input characters.

On the other hand, if the pressed button is not the input button 300 according to the determination result of the step S510, it is determined whether the pressed button is the mode switching button 20 (S518). If it is determined that the pressed button is not the mode switching button 20 according to the determination result at step S518, the process ends, while if the pressed button is the mode switching button 20, the mode state is switched from the alphabet character mode to the special character mode, such that the mode is set to the special character mode (S519). Then, the mode transitions to the special character mode (S520).

An arbitrary button is pressed in the special character mode (S521), and it is determined whether the pressed button is the input button 300 (S522). If the pressed button is the input button 300 according to the determination result of step S522, the processing step proceeds to a next step S523, and a selection-indication button is pressed (S523). If the first selection-indication button 17 of the selection-indication buttons is pressed (S524), the input of the special character "@" is recognized (S525). If the second selection-indication button 18 is pressed (S526), the input of the special character "#" is recognized (S527). Further, if the third selection-indication button 19 is pressed (S528), the input of the special character "$" is recognized (S529). Then, the processing step returns to the step S520 so as to continuously input special characters.

On the other hand, if the pressed button is not the input button 300 according to the determination result of the step S522, it is determined whether the pressed button is the mode switching button 20 (S530). If the pressed button is not the mode switching button 20 according to the determination result at step S530, the process ends, while if the pressed button is the mode switching button 20, the processing step returns to the step S501, such that the mode state is set to the numeral mode (S501) and transitions to the numeral mode (S502).

It should be noted that the end in each process for proceeding from steps S506, S518 and S530 to end steps can be set to transition to an input exit state for operations not provided by the present invention among inputs of modes. However, such abnormal input processing can be set to transition to more intelligent processing states.

Figure 6:
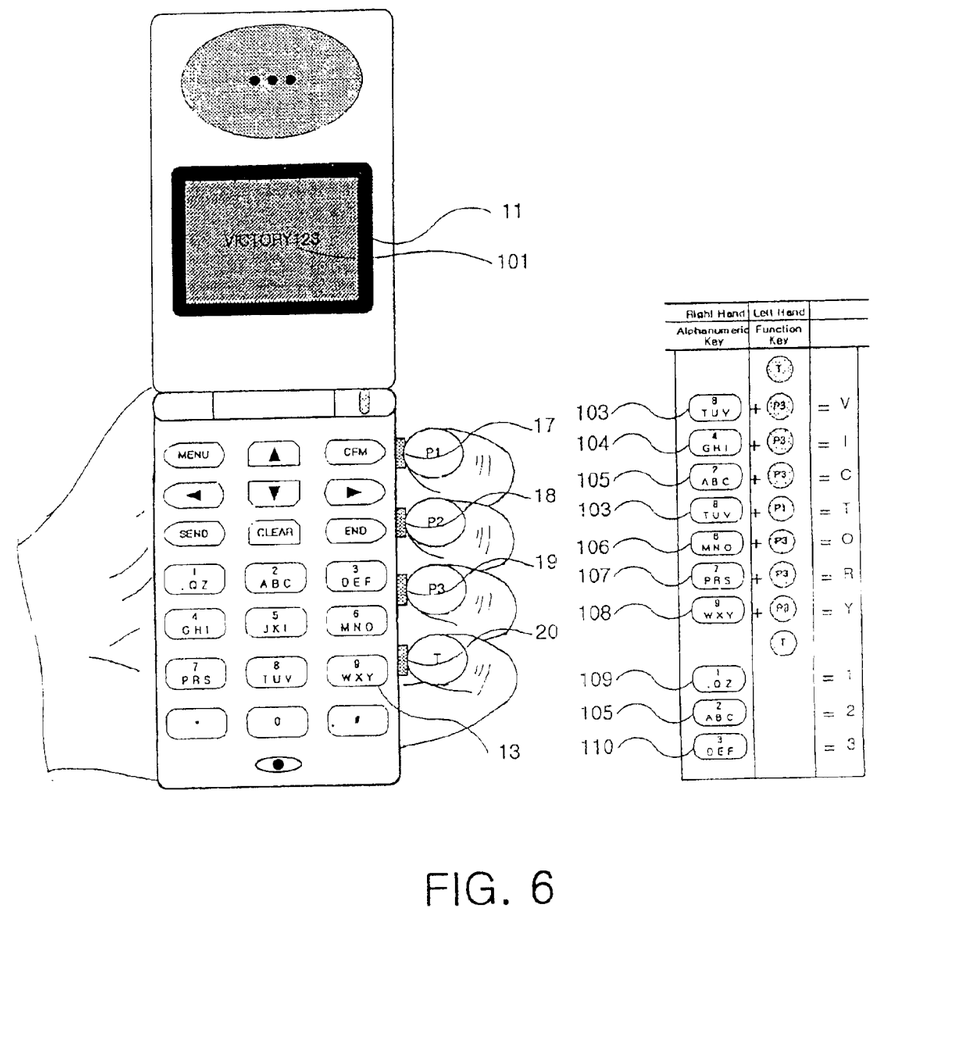
FIG. 6 is a view showing the input operation of the small-sized terminal with supplementary buttons according to a preferred embodiment of this invention.

FIG. 6 is a view showing the input operation of the small-sized terminal with supplementary buttons of this invention. That is, FIG. 6 shows an example of the input operation for alphabet characters, numerals, and special characters using the user interface of the keypad assembly according to a preferred embodiment of this invention. As shown in FIG. 6a, in the preferred embodiment of this invention, the user operates the mode switching button 20 and the three selection-indication buttons 17 to 19 installed on the right side of the terminal while supporting the small-sized terminal by the user's left hand, and operates the keypad of the character input buttons 13 by the user's right hand. In this case, it is assumed that the basic input mode of the character editor in the control unit is the numeral mode. FIG. 6b shows a table representing a process of inputting the input character string of FIG. 6a.

In order to display characters and numerals 101 of "VICTORY123" on the display window 11, first the input mode, which is set to the numeral mode in current, must be switched to the alphabet character mode. For this operation, the input mode must be set to the alphabet character mode by pressing the mode switching button 20. Next, a character "V" is inputted by combining and pressing the input button 103 representing "V" and the third selection-indication button 19. Then, a character "I" is inputted by combining and pressing the input button 104 representing "I" and the third selection-indication button 19. A character "C" is inputted by combining and pressing the input button 105 representing "C" and the third selection-indication button 19. A character "T" is inputted by combining and pressing the input button 103 representing "T" and the first selection-indication button 17. A character "O" is inputted by combining and pressing the input button 106 representing "O" and the third selection-indication button 19, and a character "R" is inputted by combining and pressing the input button 107 representing "R" and the second selection-indication button 18. A character "Y" is inputted by combining and pressing the input button 108 representing "Y" and the third selection-indication button 19. Therefore, "VICTORY" is inputted in the alphabet character mode. Next, the mode switching button 20 for switching the input mode from the current alphabet character mode to the numeral mode is pressed so as to input numerals. Then, the current input mode is switched to the numeral mode, and the numeral "1" is inputted by pressing the input button 109 representing the numeral "1". Further, the numeral "2" is inputted by pressing the input button 105 representing the numeral "2", and the numeral "3" is inputted by pressing the input button 110 representing the numeral "3". Therefore, "VICTORY123" which is the character-numeral string 101 is completely inputted. On the other hand, the above procedures are processed by the control unit of this invention and the control unit controls the overall operating states of the present invention. The control unit is preferably realized as a microprocessor.

Here, FIG. 6 shows an example for inputting alphabet characters and numerals, however, it can be set to input special characters as described above. This process can be achieved by realizing operations for representing numerals, alphabet characters and special characters established on the input button of the keypad and processing them, and a control process switching algorithm, such as in the present invention.

Further, the process for restrictively inputting alphabet characters, numerals, and special characters is disclosed in the detailed description and drawings of the present invention. However, the keypad structure, the operation method, and the control process switching algorithm of this invention can also be applied to the input of Korean characters. The alphabet characters and numerals are preferable embodiments of this invention for description, and do not restrict the scope of the present invention. Further, in the detailed description of the present invention, the character input process using the supplementary mode switching button and selection-indication buttons is disclosed. However, the character input process can be variously produced according to the field, and can be used in pointing devices, direction buttons and a variety of other applications. Such supplementary buttons can be easily applied if the concept of the present invention is used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides a keypad assembly with supplementary buttons, in which the user's character selection-indication can be easily achieved, and the keypad assembly has an independent mode switching button, such that continuous operations of switching and inputting are accomplished by using the keypad structure, the operation method, and the control process switching algorithm of this invention.

Further, the present invention is advantageous in that it can reduce the number of presses for character input buttons and reduce the user's operating confusion. The present invention can improve character input speed and eliminate input recognition delay by using a plurality of selection-indication buttons. In this case, the present invention can remove the problem of waiting some delay time between button pressing operations so as to recognize one character by a terminal.

Further, the present invention is advantageous in that it can be used as pointing devices, and direction buttons in electronic games, and it can be effective in various other applications.

What is claimed is:

1. A key assembly with supplementary buttons in a small-sized mobile communication terminal including input buttons for representing a plurality of characters and a plurality of function buttons, comprising:

at least one mode-switching button formed on a side of the terminal for switching an input mode for inputting different characters;

at least one selection-indication button formed on a side of the terminal for selecting and indicating one of a plurality of characters assigned to each input button; and a control unit for allowing a specific input mode to be selected by pressing the mode switching button, for allowing a specific character to be selected and inputted by pressing the input button and the selection-indication button in order to select and input a specific one of a plurality of characters assigned to a specific input button under the selected input mode, for displaying the selected and inputted data on a display window of the terminal and for storing the data.

2. The keypad assembly according to claim 1, wherein the mode switching button is pressed, such that a numeral mode, an alphabet character mode and a special character mode are circularly switched.

3. The keypad assembly according to claim 1, wherein each character is selected and inputted by pressing an input button representing a character to be inputted in the selected input mode, and then pressing a selection-indication button corresponding to the character.

4. The keypad assembly according to claim 1, wherein the selection-indication button is used in both an alphabet character mode and a special character mode.

5. The keypad assembly according to claim 1, wherein the selection-indication button is formed to have the same number of buttons as that of characters assigned to each input button.

6. The keypad assembly according to claim 1, wherein the selection-indication button is formed to have the same number of buttons as that of special characters assigned to each input button.

7. The keypad assembly according to claim 5 or 6, wherein the selection-indication button corresponds to one character assigned to each input button.

8. A method for operating a keypad assembly with supplementary buttons in a small-sized mobile communication terminal including a processor, input buttons for representing a plurality of characters and a plurality of function buttons, comprising the steps of:

a) forming at least one mode switching button for switching an input mode for inputting characters and at least one selection-indication button for selecting and indicating one of a plurality of characters assigned to each input button on a side of the terminal;

b) switching an input mode for inputting characters using the mode switching button;

c) pressing an input button representing a character to be inputted in the switched input mode;

d) selecting and indicating one of characters assigned to each input button by pressing a corresponding selection-indication button of at least one selection-indication button according to the sequence of characters assigned to each input button; and e) displaying the selected and inputted data on a display window of the terminal and storing the data.

9. The method according to claim 8, wherein the mode switching button is pressed, such that a numeral mode, an alphabet character mode and a special character mode are circularly switched.

10. The method according to claim 8, wherein the selection-indication button is used in both an alphabet character mode and a special character mode.

11. The method according to claim 8, wherein the selection-indication button is formed to have the same number of buttons as that of characters assigned to each input button.

12. The method according to claim 8, wherein the selection-indication button is formed to have the same number of buttons as that of special characters assigned to each input button.

13. The method according to claim 11 or 12, wherein the selection-indication button corresponds to one character assigned to the input button.

14. The method according to claim 11 or 12, wherein the selection-indication button corresponds to each character and each special character on the input button.

* * * * *